(12) United States Patent
Ding (10) Patent No.: US 12,393,209 B2
(45) Date of Patent: Aug. 19, 2025

(54) METHODS AND APPARATUS FOR REPORTING INLET PRESSURE IN MASS FLOW CONTROLLERS

(71) Applicant: MKS Instruments, Inc., Andover, MA (US)

(72) Inventor: Junhua Ding, Boxborough, MA (US)

(73) Assignee: MKS, Inc., Andover, MA (US)

(*) Notice: Subject to any disclaimer, the term of this patent is extended or adjusted under 35 U.S.C. 154(b) by 64 days.

(21) Appl. No.: 18/417,194

(22) Filed: Jan. 19, 2024

(65) Prior Publication Data

US 2025/0238043 A1 Jul. 24, 2025

(51) Int. Cl.
*G05D 7/06* (2006.01)
*F16K 7/16* (2006.01)
(Continued)

(52) U.S. Cl.
CPC .............. *G05D 7/0647* (2013.01); *F16K 7/16* (2013.01); *F16K 31/004* (2013.01); *G01F 1/34* (2013.01);
(Continued)

(58) Field of Classification Search
CPC ...... G05D 7/0647; G05D 7/0635; G01F 1/86; G01F 1/34; G01F 1/363; G01F 1/50; G01F 1/42; F16K 31/004; F16K 7/16
(Continued)

(56) References Cited

U.S. PATENT DOCUMENTS 5,816,285 A * 10/1998 Ohmi .................. G05D 7/0635
137/486
8,240,324 B2 8/2012 Monkowski et al.
(Continued)

FOREIGN PATENT DOCUMENTS

| CN | 112000139 A | 11/2020 |
| WO | 2015/123008 A1 | 8/2015 |
| WO | 2024/129229 A1 | 6/2024 |

OTHER PUBLICATIONS

International Search Report and Written Opinion for Int'l Appl. No. PCT/US2025/011705, entitled "Methods and Apparatus for Reporting Inlet Pressure in Mass Flow Controllers", consisting of 13 pages. Date of Mailing: Mar. 21, 2025.
(Continued)

*Primary Examiner* — Minh Q Le
(74) *Attorney, Agent, or Firm* — Hamilton, Brook, Smith & Reynolds, P.C.

(57) ABSTRACT

Mass flow control (MFC) devices capable of reporting inlet pressure and methods of reporting inlet pressure are provided. A mass flow controller (MFC) includes a chamber configured to receive a fluid, an upstream valve disposed upstream of the chamber, and a downstream control valve disposed downstream of the chamber. The MFC further includes a pressure sensor that detects fluid pressure in the chamber. The MFC further includes a controller configured to control actuation of the upstream valve. The controller is configured to toggle between two modes of reporting a measured inlet pressure. In a first mode, the controller reports a measured inlet pressure based on a reading from the pressure sensor and storing the reading to a buffer when the upstream valve is open. In a second mode, the controller reports the measured inlet pressure based on the reading stored to the buffer when the upstream valve is closed.

4 Claims, 9 Drawing Sheets

(51) Int. Cl.
*F16K 31/00* (2006.01)
*G01F 1/34* (2006.01)
*G01F 1/36* (2006.01)
*G01F 1/42* (2006.01)
*G01F 1/50* (2006.01)
*G01F 1/86* (2006.01)

(52) U.S. Cl.
CPC .............. *G01F 1/363* (2013.01); *G01F 1/42* (2013.01); *G01F 1/50* (2013.01); *G01F 1/86* (2013.01); *G05D 7/0635* (2013.01)

(58) Field of Classification Search
USPC .................................................. 137/2, 487.5
See application file for complete search history.

(56) References Cited

U.S. PATENT DOCUMENTS

| | | | | |
|---|---|---|---|---|
| 8,271,210 | B2* | 9/2012 | Chung | G01F 1/88 702/50 |
| 8,794,261 | B2* | 8/2014 | Watanabe | G05D 7/0647 137/486 |
| 9,846,074 | B2* | 12/2017 | Ding | G01F 25/13 |
| 9,983,595 | B2 | 5/2018 | Monkowski et al. | |
| 10,054,959 | B2* | 8/2018 | Somani | G01F 15/005 |
| 10,401,202 | B2 | 9/2019 | Monkowski et al. | |
| 2006/0236781 | A1* | 10/2006 | Ohmi | G05D 7/0635 73/861.52 |
| 2011/0137582 | A1* | 6/2011 | Chung | G01F 1/34 702/47 |
| 2014/0083514 | A1* | 3/2014 | Ding | G01F 15/046 137/12 |
| 2014/0158211 | A1* | 6/2014 | Ding | G01F 15/003 137/486 |
| 2015/0007897 | A1 | 1/2015 | Valentine et al. | |
| 2015/0114499 | A1* | 4/2015 | Dohi | F16K 7/16 137/613 |
| 2015/0121988 | A1 | 5/2015 | Banares et al. | |
| 2018/0246533 | A1* | 8/2018 | Somani | G01F 1/88 |
| 2019/0278305 | A1* | 9/2019 | Takijiri | H01L 21/67017 |
| 2020/0319658 | A1* | 10/2020 | Somani | G01F 1/40 |
| 2020/0321225 | A1* | 10/2020 | Ding | C23C 16/45525 |
| 2021/0240208 | A1* | 8/2021 | Hirata | G05D 7/0647 |
| 2024/0201713 | A1 | 6/2024 | Ding | |

OTHER PUBLICATIONS

U.S. Appl. No. 63/433,310, entitled "Method and Apparatus for Mass Flow Control," filed Dec. 16, 2022., U.S. Appl. No. 63/433,310.

* cited by examiner

METHODS AND APPARATUS FOR REPORTING INLET PRESSURE IN MASS FLOW CONTROLLERS

BACKGROUND

A semiconductor fabrication process can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc. Other components, such as valves, pressure regulators, mass flow controllers (MFCs), mass flow ratio controllers (FRCs), mass flow meters (MFMs), mass flow verifiers (MFVs), and the like can be included in the gas metering system or in a flow path from the gas metering system to a processing tool. Components such as MFCs, FRCs, MFMs, and MFVs are provided to ensure the precise delivery of process gases.

In general, a mass flow controller (MFC) controls and monitors the rate of fluid flow (e.g., of a gas or vapor) in real time so that the flow rate of the mass of a gas passing through the device can be metered and controlled. A traditional pressure-based MFC includes a flow control valve and a pressure drop element, such as a flow nozzle. The MFC can measure flow rate with use of one or more pressure sensors. The MFC controls the rate of flow based on a given setpoint, usually predetermined by the user or an external device, such as a semiconductor tool. The setpoint can be changed with each step of a process.

SUMMARY

Mass flow control devices capable of reporting inlet pressure and methods of reporting inlet pressure are provided.

A mass flow controller (MFC) includes a chamber configured to receive a fluid, an upstream valve disposed upstream of the chamber, and a downstream control valve disposed downstream of the chamber. The MFC further includes a pressure sensor that detects fluid pressure in the chamber. The MFC further includes a controller configured to control actuation of the upstream valve. The controller is configured to toggle between two modes of reporting a measured inlet pressure. In a first mode, the controller reports a measured inlet pressure based on a reading from the pressure sensor and storing the reading to a buffer when the upstream valve is open. In a second mode, the controller reports the measured inlet pressure based on the reading stored to the buffer when the upstream valve is closed. The controller may be further configured to prevent or refrain from updating the reading stored to the buffer when the upstream valve is closed.

The pressure sensor may be a first pressure sensor, and the MFC may further include a pressure drop element disposed downstream of the downstream control valve. A second pressure sensor may detect fluid pressure downstream of the downstream control valve and upstream of the pressure drop element. The controller may be configured to control actuation of the downstream control valve. The controller may be configured to toggle between flow-based feedback control and pressure-based feedback control for operation of the control valve. In flow-based feedback control, a flow is monitored based on a rate of decay of pressure in the chamber as detected by the first pressure sensor upon closure of the upstream control valve. In pressure-based feedback control, a pressure upstream of the pressure drop element, as detected by the second pressure sensor, is monitored.

The controller of the MFC can be further configured to, during flow-based feedback control, record a pressure as detected by the second pressure sensor for use during pressure-based feedback control. A pressure setpoint for pressure-based feedback control based on the recorded pressure can be established. Alternatively, or in addition, a coefficient for use with calculation of a flow rate during pressure-based feedback control can be determined. The coefficient can be determined based on the recorded pressure.

During flow-based feedback control, the controller of the MFC can be configured to measure a flow rate of fluid $Q$ and compare the measured flow rate to a flow rate setpoint $Q_{sp}$. For example, the measured flow rate $Q$ can be determined according to the following:

$$Q = \frac{k \cdot V \cdot T_{stp}}{P_{stp}} \cdot \frac{d\left(\frac{P_1}{T}\right)}{dt} \tag{1}$$

where V is a volume of the chamber, Tstp is a standard temperature, Pstp is a standard pressure, P1 is the detected pressure of the fluid in the chamber by the first pressure sensor, and T is a detected temperature of the fluid.

During pressure-based feedback control, the controller of the MFC can be configured to determine a flow rate of fluid $Q_{cf}$ and compare the determined flow rate to a flow rate setpoint $Q_{sp}$. For example, the determined flow rate $Q_{cf}$ can be calculated according to the following:

$$Q_{cf} = K_{cf} P_2 \tag{2}$$

where $K_{cf}$ is a coefficient and $P_2$ is the pressure as detected by the second pressure sensor. The coefficient Kef can be determined according to the following:

$$K_{cf} = Q/P_{cf} \tag{3}$$

where $Q$ is a stabilized flow rate as determined during flow-based feedback control and $P_{cf}$ is a pressure as detected by the second pressure sensor during stabilized flow at the stabilized flow rate $Q$. Alternatively, the controller can be configured to determine the flow rate of fluid $Q_{cf}$ by a lookup table.

The controller of the MFC can include a flow controller and a pressure controller. The flow controller can be configured to monitor the flow rate based on the rate of decay and compare the monitored flow rate to a flow rate setpoint. The pressure controller can be configured to monitor the pressure as detected by the second pressure sensor and compare the monitored pressure to a pressure setpoint. Optionally, the upstream valve can be a control valve.

A method of controlling a flow rate includes toggling between two modes of reporting a measured inlet pressure. A fluid is received to a chamber disposed between an upstream valve and a downstream control valve. Fluid pressure is detected in the chamber, and actuation of the upstream valve is controlled by a controller. In a first mode, a measured inlet pressure is reported based on a reading from the pressure sensor and storing the reading to a buffer when the upstream valve is open. In a second mode, the the measured inlet pressure is reported based on the reading stored to the buffer when the upstream valve is closed.

The method may further include toggling between flow-based feedback control and pressure-based feedback control of actuation of a downstream control valve of a mass flow controller. Flow-based feedback control includes monitoring of a flow rate based on a rate of decay of pressure of fluid in a chamber of the mass flow controller. The rate of decay of pressure is based on pressure as detected by a first pressure sensor upon closure of a valve disposed upstream of the chamber, the first pressure sensor detecting fluid pressure in the chamber. Pressure-based feedback control includes monitoring of a pressure upstream of a pressure drop element based on a pressure as detected by a second pressure sensor. The pressure drop element is disposed downstream of the downstream control valve, and the second pressure sensor detects fluid pressure downstream of the downstream control valve and upstream of the pressure drop element.

The method can further include, during flow-based feedback control, recording a pressure as detected by the second pressure sensor for use during pressure-based feedback control. A pressure setpoint for pressure-based feedback control based on the recorded pressure can be established. Alternatively, or in addition, a coefficient for use with calculation of a flow rate during pressure-based feedback control can be determined. The coefficient can be determined based on the recorded pressure.

During flow-based feedback control, the method can include measuring a flow rate of fluid $Q$ and comparing the measured flow rate to a flow rate setpoint $Q_{sp}$. The measured flow rate can be calculated according to Eqn. 1, above.

During pressure-based feedback control, the method can include determining a flow rate of fluid $Q_{cf}$ and comparing the determined flow rate to a flow rate setpoint $Q_{sp}$. The determined flow rate $Q_{cf}$ can be determined according to Eqn. 2, above, and the coefficient for use in Eqn. 2 can be determined according to Eqn. 3, above.

A mass flow controller (MFC) includes a chamber configured to receive a fluid, an upstream valve disposed upstream of the chamber, and a downstream control valve disposed downstream of the chamber. The MFC further includes a pressure drop element disposed downstream of the downstream control valve and first and second pressure sensors. The first pressure sensor detects fluid pressure in the chamber, and the second pressure sensor detects fluid pressure downstream of the downstream control valve and upstream of the pressure drop element. The MFC further includes a controller configured to control actuation of the downstream control valve. The controller is configured to monitor a pressure upstream of the pressure drop element as detected by the second pressure sensor, determine a flow rate based on the monitored pressure and a coefficient, actuation of the downstream control valve being controlled based on modulation of the determined flow rate to a flow setpoint, determine a verification flow rate based on a rate of decay of pressure in the chamber as detected by the first pressure sensor upon closure of the upstream control valve, and update the coefficient based on the verification flow rate.

A mass flow controller (MFC) includes a chamber configured to receive a fluid, an upstream valve disposed upstream of the chamber, and a downstream control valve disposed downstream of the chamber. The MFC further includes a pressure drop element disposed downstream of the downstream control valve and first and second pressure sensors. The first pressure sensor detects fluid pressure in the chamber, and the second pressure sensor detects fluid pressure downstream of the downstream control valve and upstream of the pressure drop element. The MFC further includes a controller configured to control actuation of the downstream control valve, the controller maintaining controlled flow based on a pressure as detected by at least one of the first pressure sensor and the second pressure sensor and recalibrating pressure-based flow control based on pressure detected by the second pressure sensor with rate of decay of pressure detected by the first pressure sensor during controlled flow.

A method of controlling a flow rate includes maintaining controlled flow by controlling actuation of a downstream control valve based on a pressure as detected by at least one of a first pressure sensor and a second pressure sensor. The first pressure sensor detects fluid pressure in a chamber configured to receive a fluid. The second pressure sensor detecs fluid pressure downstream of the downstream control valve and upstream of a pressure drop element, the pressure drop element disposed downstream of the downstream control valve. The method further includes recalibrating pressure-based flow control based on pressure detected by the second pressure sensor with rate of decay of pressure detected by the first pressure sensor during controlled flow.

A mass flow controller (MFC) includes a chamber configured to receive a fluid, an upstream valve disposed upstream of the chamber, and a downstream control valve disposed downstream of the chamber. The MFC further includes a pressure drop element disposed downstream of the downstream control valve and first and second pressure sensors. The first pressure sensor detects fluid pressure in the chamber, and the second pressure sensor detects fluid pressure downstream of the downstream control valve and upstream of the pressure drop element. The MFC further includes a controller configured to control actuation of the downstream control valve. The controller is configured to provide pressure-based flow control based on monitoring of a pressure upstream of the pressure drop element as detected by the second pressure sensor. The controller is further configured to determine a verification flow rate based on a rate of decay of pressure in the chamber as detected by the first pressure sensor upon closure of the upstream control valve while maintaining the pressure-based flow control or flow control based on the rate of decay pressure in the chamber, and to recalibrate the pressure-based flow control based on the verification flow rate.

The MFC can be further configured to toggle between providing the pressure-based flow control and providing flow control based on monitoring of a flow rate based on the rate of decay pressure in the chamber as detected by the first pressure sensor. Alternatively, the MFC can be further configured to maintain controlled flow based on the pressure-based flow control during determination of the verification flow rate.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

An MFC typically includes a system controller as part of a feedback control system that provides a control signal to the control valve as a function of a comparison of the flow rate as dictated by the setpoint with a measured flow rate. The feedback control system thus operates the flow control valve to maintain the measured flow rate at the setpoint flow rate. In pressure-based mass flow control, mass flow rate can be measured by a pressure sensor and a temperature sensor with a critical flow nozzle under a critical flow condition, or by two pressure sensors and a temperature sensor under a non-critical flow condition. With either approach, a pressure upstream of the flow nozzle is typically obtained for use in a flow calculation.

In a traditional MFC, a feedback control system assumes that the MFC remains in calibration within certain tolerances. To test whether an MFC is within the tolerances of calibration, the MFC is typically tested off line, such as with a mass flow verifier (MFV). While offline testing can be very accurate, it does not provide a solution to the problem of an MFC coming out of calibration during the running of a process. Often, an out-of-calibration MFC is not detected until the process is completed, which can result in a lower product yield or loss of an entire product yield. Loss of yield can result in a significant expense and is clearly undesirable.

A prior art method of providing for self-verification is described in U.S. Pat. No. 10,801,867, the entire teachings of which are incorporated herein by reference. As described therein, a flow verification check of an MFC can be performed during transitions from a non-zero setpoint to a zero setpoint. The verification of flow rate is based on a rate of decay of pressure as fluid continues to flow from a reservoir upstream of the MFC.

Other prior art methods and devices for providing self-verification in an MFC require complicated hardware configurations, such as devices requiring highly-sensitive valve position feedback components to provide for an independent flow measurement and devices including several additional components to provide for, essentially, a discrete mass flow verifier (MFV) built into an MFC. There exists a need for improved mass flow control devices and methods that are capable of in situ verification and/or calibration.

Mass flow control devices capable of self-verification, as well as reporting inlet pressure, are provided. The provided devices include an improved control system and hardware configuration. A mass flow control device providing self-verification is described in U.S. Patent Application No. 63/433,310, titled "Method and Apparatus for Mass Flow Control," filed on Dec. 16, 2022, the entire teachings of which are incorporated herein by reference.

Figure 1:
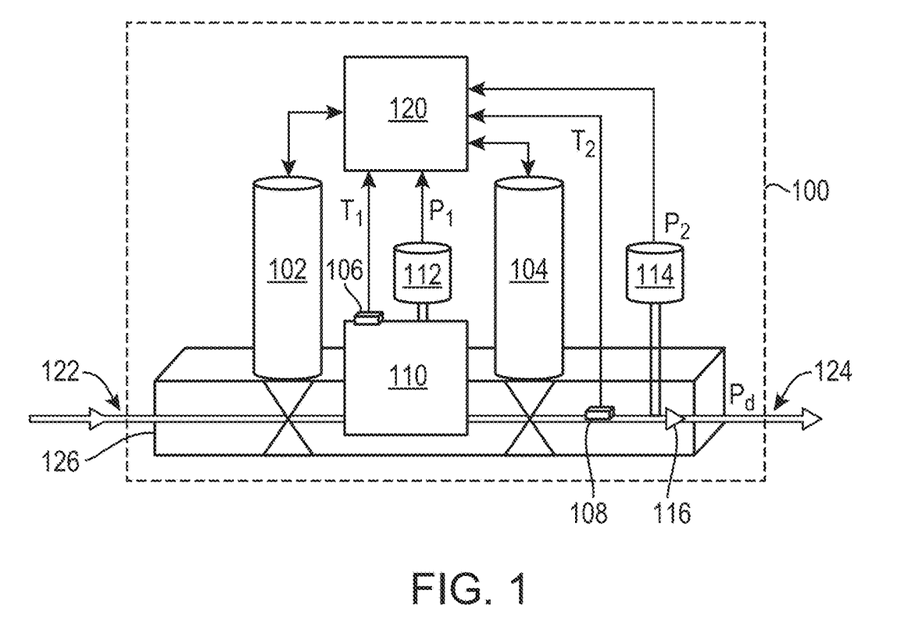
FIG. 1 is a schematic of an example mass flow controller.

As shown in FIG. 1, a mass flow controller 100 receives a flow of a fluid at an inlet 122, and the fluid flows through a body 126 of the device. The MFC 100 includes an upstream valve 102 and a downstream valve 104. As illustrated, both valves 102, 104 are adjustable control valves; however, the upstream valve 102 can alternatively be an on/off-type valve.

As used herein, the term "control valve" refers to a valve that can provide for a controllable range of open states, likely between on and off states, and excludes on/off-type valves. The openness of an adjustable control valve can be controlled in response to a control signal, and a flow rate through the valve can be controlled. Adjustable control valves include proportional control valves. Examples of suitable control valves for use as an adjustable control valve in the provided devices include solenoid valves, piezo valves, and step motor valves.

The MFC further includes a chamber 110, a temperature sensor 106 that detects a temperature of a fluid in the chamber 110, and a pressure sensor 112 that detects fluid pressure in the chamber 110. The chamber 110 is disposed between the upstream valve 102 and the downstream control valve 104 and is provided for rate-of-pressure decay control measurements. The MFC further includes a critical flow nozzle 116. A second pressure sensor 114 and, optionally, a second temperature sensor 108 are disposed downstream of the control valve 104 and upstream of the critical flow nozzle 116. The second pressure sensor 114 is provided for pressure control measurements. Fluid flows out of the MFC at an outlet 124.

The MFC 100 further includes a controller 120, which can receive sensed temperature and pressure information from sensors 106, 108, 112, 114 and provide control signals to operate valves 102 and 104. In one embodiment, the MFC 100 may combine rate-of-pressure-decay flow control and pressure control for regulating fluid flow through the device to a setpoint. For example, monitoring of flow can be performed by alternating between obtaining upstream rate-of-pressure-decay flow measurements (e.g., for comparison to a flow setpoint) and obtaining downstream pressure measurements (e.g., for comparison to a pressure setpoint). The pressure setpoint for a downstream pressure control period can be in situ determined when flow through the device is regulated to the flow setpoint and stabilized during an upstream rate-of-pressure-decay flow control period.

In an example operation of the MFC 100, an upstream rate of pressure decay is obtained based on pressure measurements obtained from the pressure sensor 112 when the upstream isolation valve 102 is shut, and the rate of pressure decay is used to measure flow for initial flow control. During this period, the controller 120 can compare measured flow to a flow set point and generate a control signal for operation of the adjustable control valve 104. When the upstream isolation valve 102 is open for charging the volume (e.g., a volume of the chamber 110 and fluid conduits), mass flow control is provided by controlling a downstream pressure of the device. During this period, the controller 120 can generate a flow control signal for operation of the adjustable control valve 104 based on pressure measurements obtained from the pressure sensor 114. While this operation is described with initial flow control being provided based on rate-of-pressure-decay measurements for use in calculating a flow rate for comparison to a flow setpoint, the device may alternatively operate with an initial pressure set point for initial pressure control, and a subsequent upstream pressure decay period can be invoked to verify the pressure set point.

Traditional pressure-based MFCs typically require that gas properties be known to determine a flow measurement of a gas through the device. Rate-of-pressure-decay measurements provide for a gas-independent method of determining flow rate. Rate-of-pressure-decay methods can be undesirable for use in a mass flow controller as re-establishing inlet gas flow when recharging an internal volume of the device can disrupt flow control provided by the device.

The MFC devices and methods provided herein can overcome the problems of traditional pressure-based MFCs by performing initial and/or intermittent periods of flow control based on rate-of-pressure-decay measurements, during which periods a pressure downstream of the chamber 110 and upstream of the critical flow nozzle 116 is also monitored. The downstream pressure ($P_2$) as detected by the downstream sensor 114 during such periods can then be used to establish a pressure setpoint for use during pressure control periods. Thus, the MFC can be self-verified for accuracy at any point in a process or periodically throughout a process while providing for continuous mass flow control.

Flow-based feedback control periods can be relatively short such that a volume of the chamber 110 does not discharge to such an extent that critical flow conditions at the nozzle 116 are disrupted. For example, the upstream pressure ($P_1$) can be monitored such that it remains above a threshold value, as further described below. Optionally, the valve 102 can be a proportional control valve such that reintroduction of a gas flow into the volume is gradual, thereby preventing potential disruptions.

The MFC 100 may be required to report the correct inlet pressure to the host during a measurement of the rate of upstream pressure decay flow even when the upstream valve is closed and the pressure sensor 112 may not be able to measure the inlet pressure. Yet, if the controller 120 were to report the pressure from the pressure sensor 112 as the inlet pressure to the host tool, it may trigger the tool pressure drop alarm. Although an additional pressure sensor can be implemented upstream of the valve 102 to directly measure the inlet pressure, such an addition can be costly and may be impractical to install at or near the MFC 100 due to the large size of typical pressure sensor. Example embodiments can address this problem by selectively reporting the inlet pressure based on the status of the upstream valve, as described below with reference to FIGS. 8-10.

Figure 2:
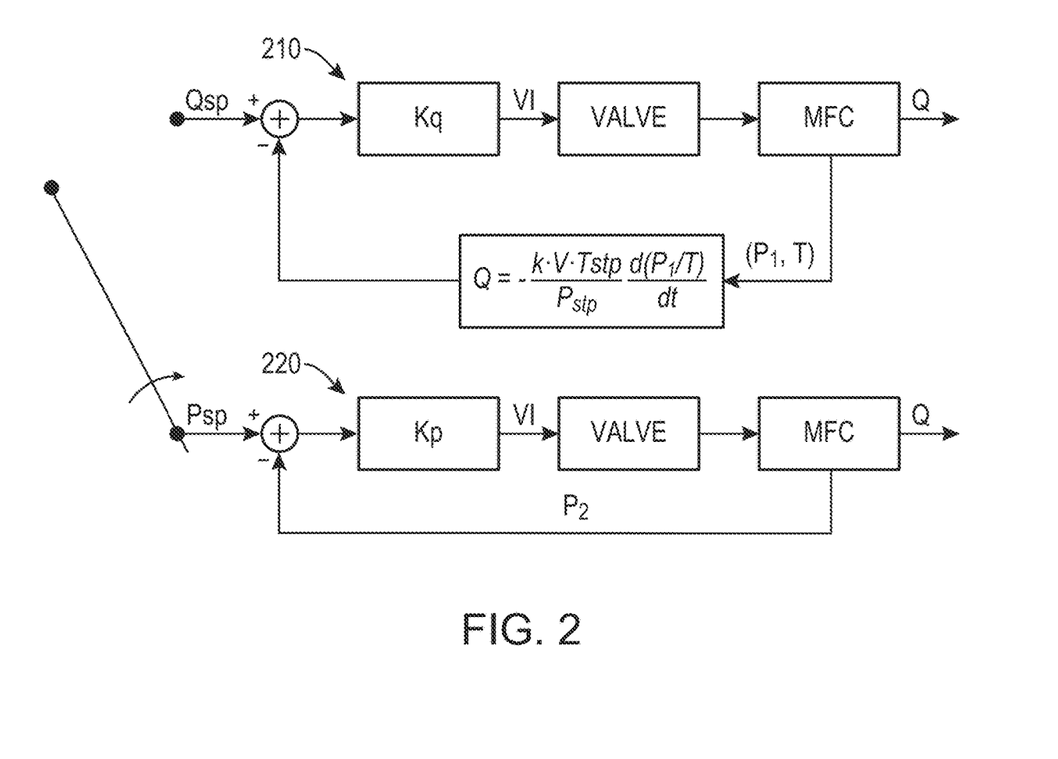
FIG. 2 is a diagram illustrating an example of feedback control provided in a mass flow controller.

In an example configuration, the controller 120 of the MFC can comprise two controllers: a flow controller 210 and a pressure controller 220, as illustrated in FIG. 2. The MFC can toggle between controllers 210 and 220, maintaining continuous controlled flow.

Flow-based control (Kq) is provided by the flow controller 210 to generate a valve input (VI) to a control valve (Valve 104) to effect mass flow control (MFC) of the device. Flow-based control can be provided by comparison of a measured flow (Q) to a flow setpoint (Qsp). The measured flow can be based on the rate-of-pressure-decay principle, which is inherently gas independent. In particular, a flow rate (Q) can be measured according to the following equation, where V is a volume of a chamber (e.g., chamber 110), $T_{stp}$ is a standard temperature, $P_{stp}$ is a standard pressure, $P_1$ is a detected pressure of the fluid in the chamber by a first pressure sensor (e.g., by pressure sensor 112), and T is a detected temperature of the fluid (e.g., by temperature sensor 106):

$$Q = \frac{k \cdot V \cdot T_{stp}}{P_{stp}} \cdot \frac{d\left(\frac{P_1}{T}\right)}{dt} \quad (1)$$

Pressure-based control (Kp) is provided by the pressure controller 220 to generate a valve input (VI) to the control valve (Valve 104) to effect mass flow control (MFC) of the device. Under critical flow conditions, a flow rate (Q) of a gas becomes independent of downstream outlet pressure (e.g., Pa in FIG. 1) and is proportional to the pressure (e.g., $P_2$ in FIG. 1) upstream of the nozzle (e.g., nozzle 116). Flow through the device based on this principle can be represented by the following, where k is a function of gas molecular weight (mw), gas specific heat ratio (Y) and gas temperature (T):

$$Q = k(mw,\gamma,T) \cdot P_2 \quad (4)$$

Controlling the pressure ($P_2$) upstream of the nozzle effectively controls the flow (Q) through the nozzle. Critical flow conditions are generally present when pressure upstream of the nozzle ($P_2$) is at least twice pressure downstream ($P_d$) of the nozzle, as given by the following:

$$P_2 \geq 2P_d \quad (5)$$

Pressure-based control can be provided by comparison of a measured pressure ($P_2$) to a pressure setpoint (Psp). This pressure setpoint (Psp) can be in situ determined when flow is stabilized by upstream rate-of-pressure-decay flow control.

Figure 3:
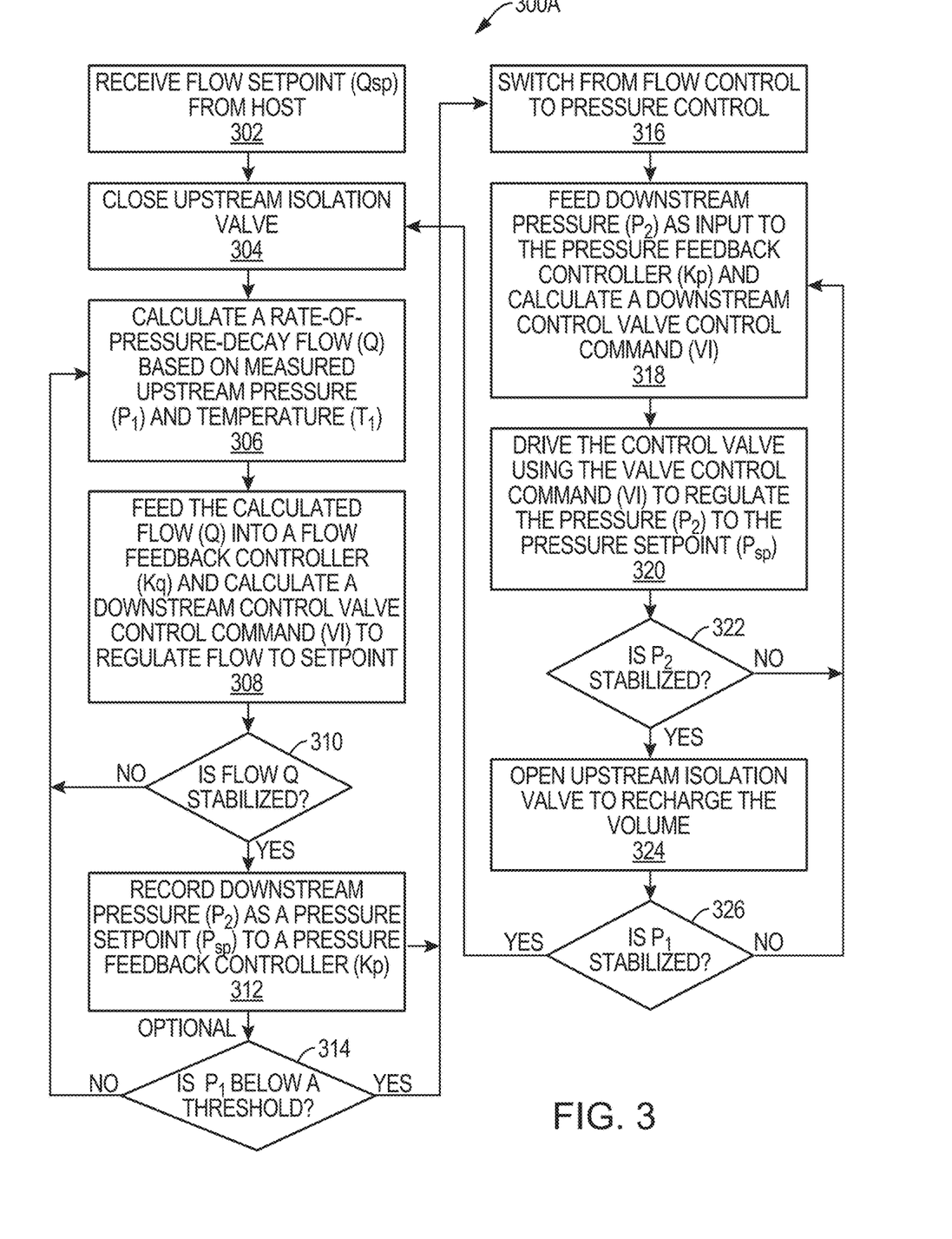
FIG. 3 is a flowchart illustrating example operation of a mass flow controller with feedback control as shown in FIG. 2.

A flowchart illustrating an example process 300A for operation of an MFC is shown in FIG. 3. A flow setpoint (Qsp) is provided to the device (302) and the upstream isolation valve (e.g., valve 102) is closed (304). A flow (Q) based on rate of pressure decay is calculated, as determined from a measured upstream pressure and temperature (306). The calculated flow (Q) is provided to a flow feedback controller (Kq), which generates a control command (VI) to the downstream control valve of the device (308). If the flow is not stabilized (310), measurements based on rate of pressure decay can continue. If the flow is stabilized (310), the downstream pressure ($P_2$) is recorded and set as the pressure setpoint ($P_{sp}$) for a pressure feedback controller (312). Operation of the device may switch from flow control to pressure control (316) at this stage. Alternatively, flow-based control can continue until the upstream pressure ($P_1$) is below a threshold value (314). On switching to pressure-based control (316), the upstream isolation valve can be opened, as may be desirable if the upstream pressure is below a threshold, or the upstream isolation valve can remain closed until stabilization of the downstream pressure ($P_2$) is reached, as illustrated by the flowchart. During pressure-based control, the downstream pressure ($P_2$) is fed as input to the pressure feedback controller (Kp), which generates a control command (VI) to the downstream control valve 104 of the device (318). The control valve is driven to regulate the monitored pressure ($P_2$) to the pressure setpoint ($P_{sp}$) (320). If the upstream isolation valve 102 has not already been opened, upon stabilization of the monitored pressure (322), the isolation valve 102 is opened to recharge the volume (324). Upon stabilization of the upstream pressure ($P_1$), the MFC may switch back to flow-based control (326). However, pressure-based control can continue for a period beyond which the upstream pressure has stabilized.

Figure 4:
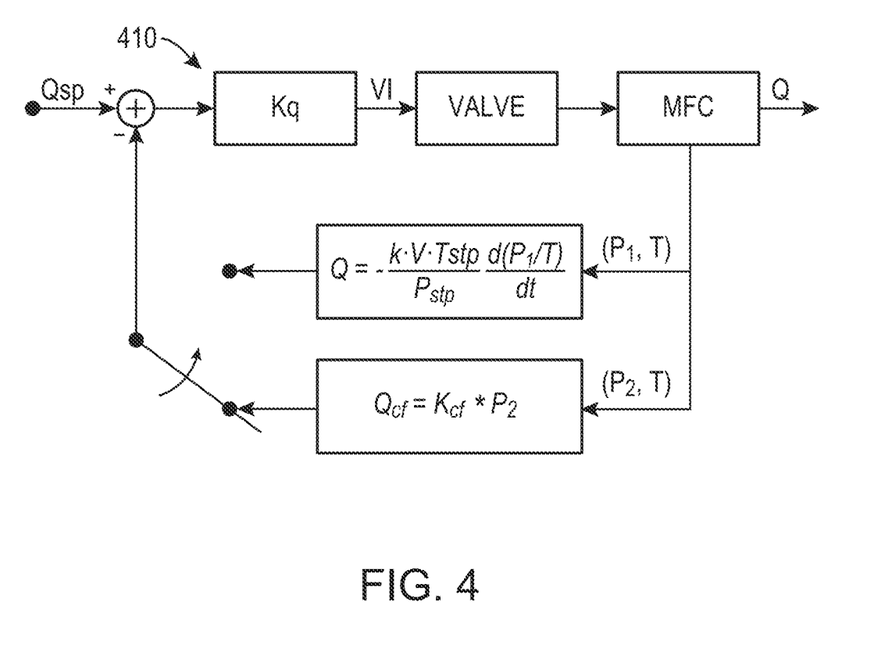
FIG. 4 is a diagram illustrating another example of feedback control provided in a mass flow controller.

In another example configuration, the controller 120 of the MFC can comprise a feedback controller 410 that can toggle between flow-based control and pressure-based control, as shown in FIG. 4. Flow-based control can be performed as described above with respect to FIG. 2 and using Eqn. 1. Pressure-based control can be performed by further processing of downstream pressure measurements for comparison to the flow setpoint (Qsp).

During pressure-based feedback control, the controller 120 of the MFC can be configured to determine a flow rate of fluid $Q_{cf}$ and compare the determined flow rate to the flow rate setpoint $Q_{sp}$. For example, the determined flow rate $Q_{cf}$ can be calculated according to the following:

$$Q_{cf} = K_{cf} P_2 \qquad (2)$$

where $K_{cf}$ is a coefficient and $P_2$ is the pressure as detected by the second pressure sensor. The coefficient $K_{cf}$ can be determined according to the following:

$$K_{cf} = Q/P_{cf} \qquad (3)$$

where $Q$ is a stabilized flow rate as determined during flow-based feedback control and $P_{cf}$ is a pressure as detected by the second pressure sensor during stabilized flow at the stabilized flow rate $Q$.

Figure 5:
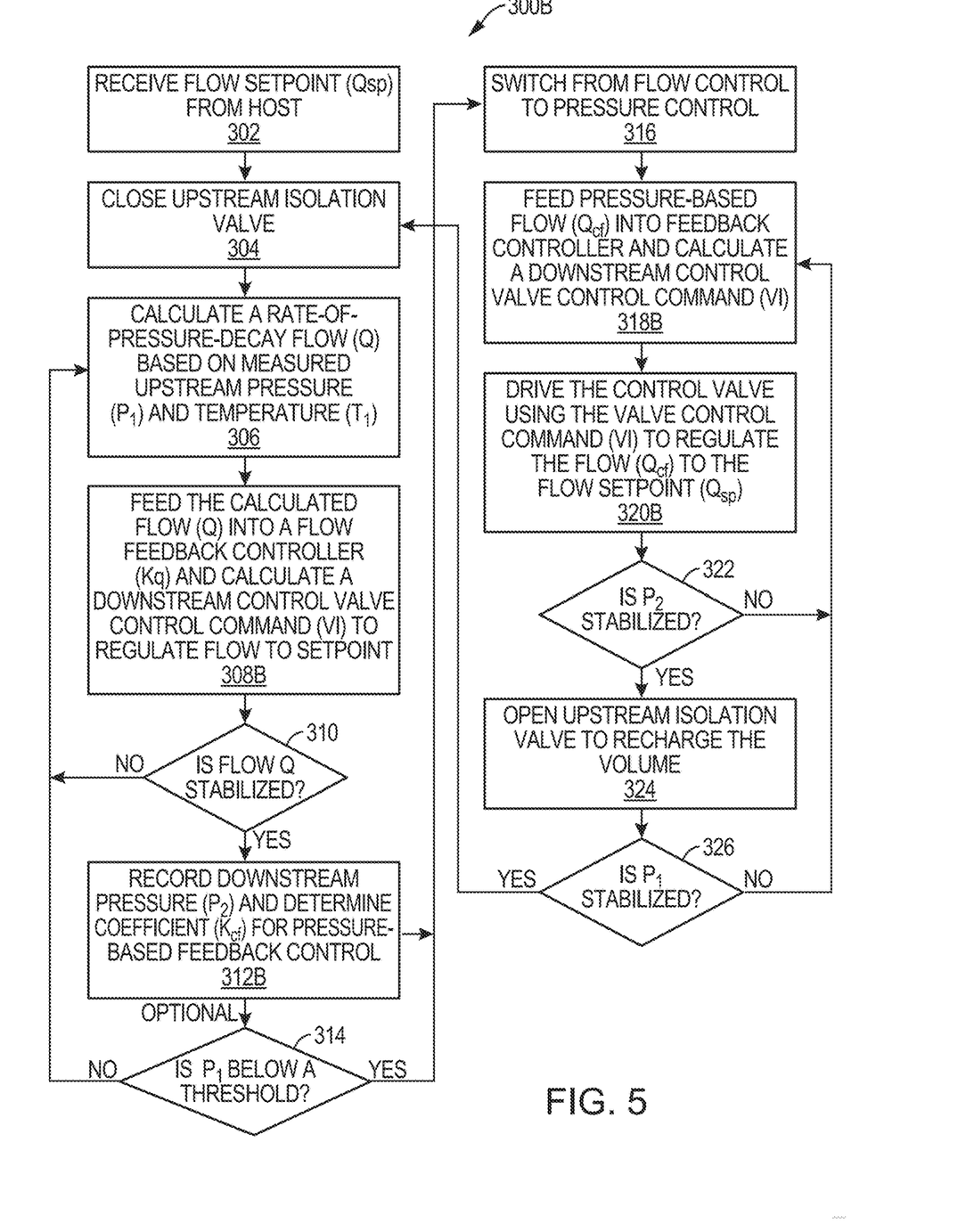
FIG. 5 is a flowchart illustrating example operation of a mass flow controller with feedback control as shown in FIG. 4.

A flowchart illustrating another example process 300B for operation of an MFC is shown in FIG. 5. The process 300B is similar to the process 300A shown in FIG. 3, except that a single feedback controller capable of providing both upstream rate-of-pressure-decay feedback control and pressure-based feedback control is included in the device. In particular, the feedback controller calculates a control command for controlling the downstream control valve based on rate-of-pressure-decay measurements (308B) and, during this flow-based feedback period, a coefficient (Kef) for use with a pressure-based feedback period is determined (312B). During a pressure-based feedback control period, a pressure-based flow ($Q_{cf}$) is determined (318B), and the feedback controller calculates a control command for controlling the downstream control valve based on comparison of this measurement to the flow setpoint (320B).

The provided MFC 100 can thus alternate periods during which the upstream isolation valve is open with periods during which it is closed. The device can use an upstream pressure measurement ($P_1$) for mass flow control during periods at which the upstream isolation valve is shut and a downstream pressure measurement ($P_2$) for mass flow control during periods at which the upstream isolation valve is open. The upstream pressure measurements can be used to calculate a flow through the device based on the principle of the rate of pressure decay, which is inherently gas independent. Such gas-independent measurements can inform a pressure setpoint for the device, determined when the rate of decay determined flow is stabilized, which would otherwise require that gas properties be known and that more complex calculations be performed to control flow. The downstream pressure measurements can then be used for pressure-based control, either directly (e.g., through comparison to a pressure setpoint) or indirectly (e.g., through conversion to a calculated flow rate for comparison to a flow setpoint, the calculated flow rate being based on a coefficient determined during flow-based feedback control).

By alternating periods of flow-based feedback control and pressure-based feedback control, an MFC can provide uninterrupted flow control while verifying pressure-based setpoints. With a configuration as shown in FIG. 1, downstream pressure-based control for regulating flow can remain very stable, even as upstream pressure varies during charging of the volume. Such MFC configurations can be particularly advantageous for low flow applications (e.g., flow set points of less than 200 sccm).

Figure 6:
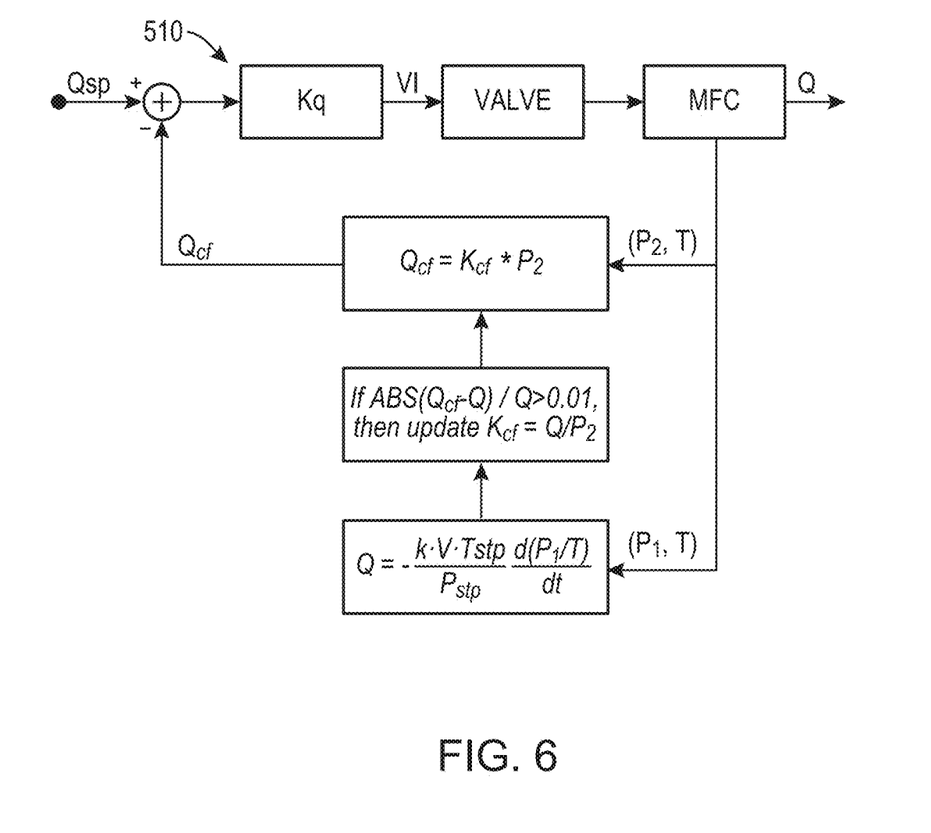
FIG. 6 is a diagram illustrating another example of feedback control provided in a mass flow controller.

In yet another example configuration, the controller 120 of the MFC can comprise a feedback controller 510 configured to provide pressure-based feedback control, as shown in FIG. 6. As illustrated, flow control is provided by monitoring of the downstream pressure, such as by Eqn. 2, with an upstream rate of pressure decay flow measurement being used to provide for verification and/or recalibration. The coefficient of Kef can be in situ determined or updated (e.g., $K_{cf} = Q/P_2$) if a flow error between Qcf and Q is above a predetermined threshold.

For example, the controller 120 can be configured to determine a flow rate $Q_{cf}$ based on the measured pressure $P_2$ and an initial or provided value for the coefficient $K_{cf}$. The determined flow rate $Q_{cf}$ can be compared to a flow setpoint Qsp to control actuation of the control valve 104.

When the measured flow $Q_{cf}$ is controlled to the flow setpoint Qsp and stabilized, the downstream pressure ($P_2$) can be recorded as Per. The controller can be further configured to perform a verification based on a rate-of-pressure-decay measurement. In particular, the upstream valve 102 can be closed, and the upstream pressure $P_1$ can be monitored to obtain a flow measurement Q, such as by Eqn. 1. The upstream valve 102 may be closed for a short duration (e.g., less than about 5 seconds) that is sufficient to obtain a flow measurement. The flow measurement Q can be used to provide a verification of $Q_{cf}$.

For example, if an error (ErrQcf) between Q and $Q_{cf}$ is above a predetermined threshold (e.g., ErrQcf>0.01), the controller can update the coefficient according to Eqn. 3. The error (ErrQcf) can be determined as follows:

$$ErrQcf = \frac{ABS(Q_{cf} - Q)}{Q} \qquad (6)$$

Alternatively, the controller can periodically replace $Q_{cf}$ with an updated value based on the measured, verified flow rate Q. Verification can be repeated intermittently or as needed by repeating the above described steps.

Figure 7:
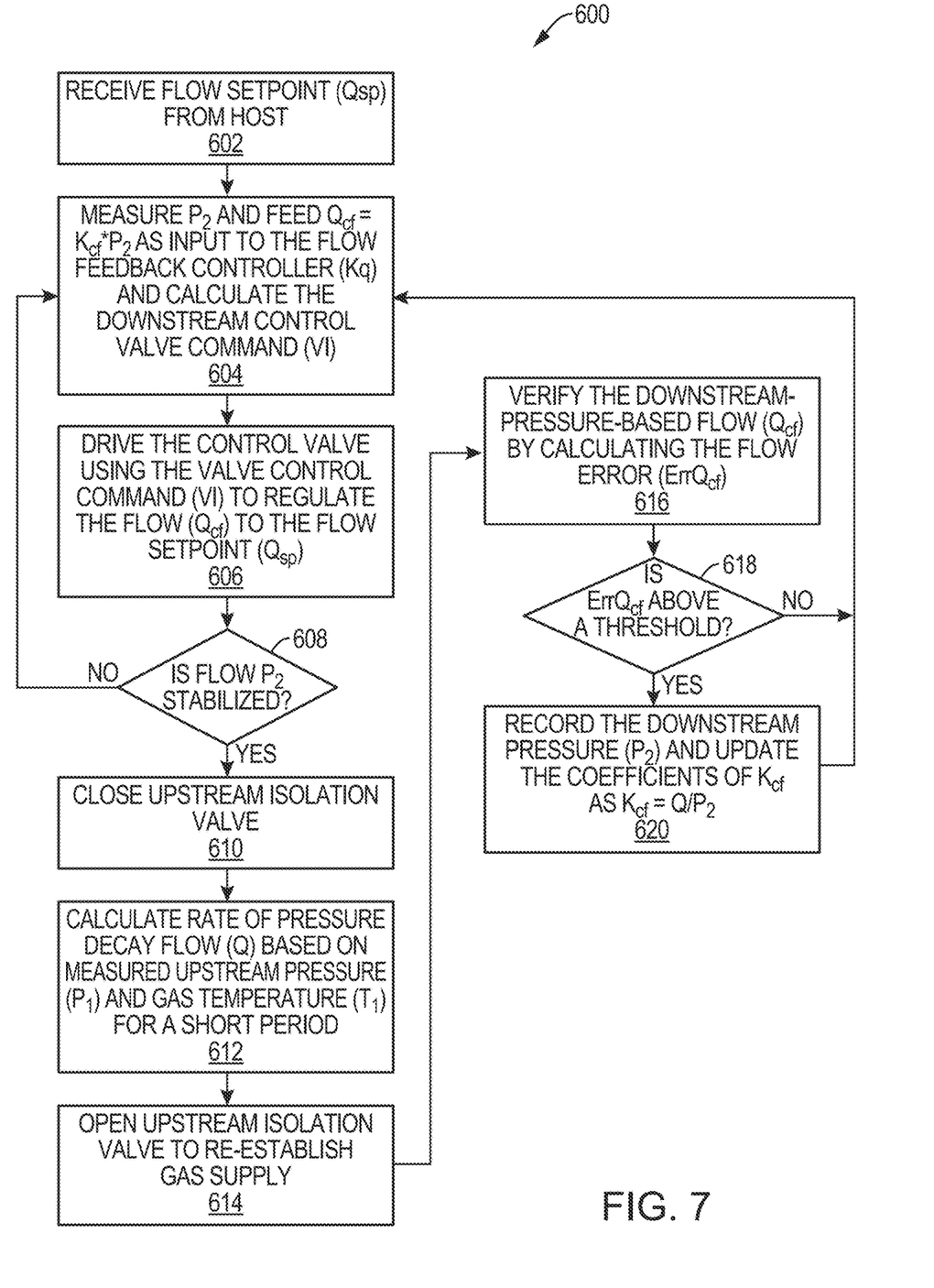
FIG. 7 is a flowchart illustrating example operation of a mass flow controller with feedback control as shown in FIG. 6.

A flowchart illustrating an example process 600 for operation of an MFC is shown in FIG. 7. A flow setpoint ($Q_{sp}$) is provided to the device (602) and the downstream pressure ($P_2$) is measured and provided as input to the flow feedback controller for determination of a control valve command (604). The control valve is driven to regulate the flow ($Q_{cf}$) to the flow setpoint ($Q_{sp}$) (606). This process can continue until the downstream pressure ($P_2$) is stabilized (608). The upstream isolation valve is then closed (610) and a rate-of-pressure-decay flow measurement is obtained based on the upstream pressure ($P_1$) (612). The upstream isolation valve is opened to reestablish gas supply (614). The downstream-pressure-based flow ($Q_{cf}$) can then be verified by determination of an error (ErrQcf) (616). If the error is above a threshold (618), the coefficient(s) can be updated to provide for recalibration of the device (620).

While the downstream-pressure-based flow measurements described above and shown in FIGS. 2, 4, and 6 are of $Q_{cf}$ being expressed by Eqns. 2 and/or 4, downstream-pressure-based flow measurements can alternatively be obtained by a lookup table (e.g., a table of pressure versus flow). Where a lookup table is used in lieu of Eqn. 2 and/or 4, or in addition to such calculations, the MFC can update the lookup table when a flow error between the pressure-based flow measurement ($Q_{cf}$) and the upstream rate-of-pressure-decay flow measurement (Q) is above a predetermined threshold.

While the MFC is shown in FIG. 1 as including a critical flow nozzle, the MFC can alternatively include other types of pressure drop elements or flow restrictors, such as, for example, a laminar flow element, a porous media flow restrictor, an orifice, or a tube.

Figure 8:
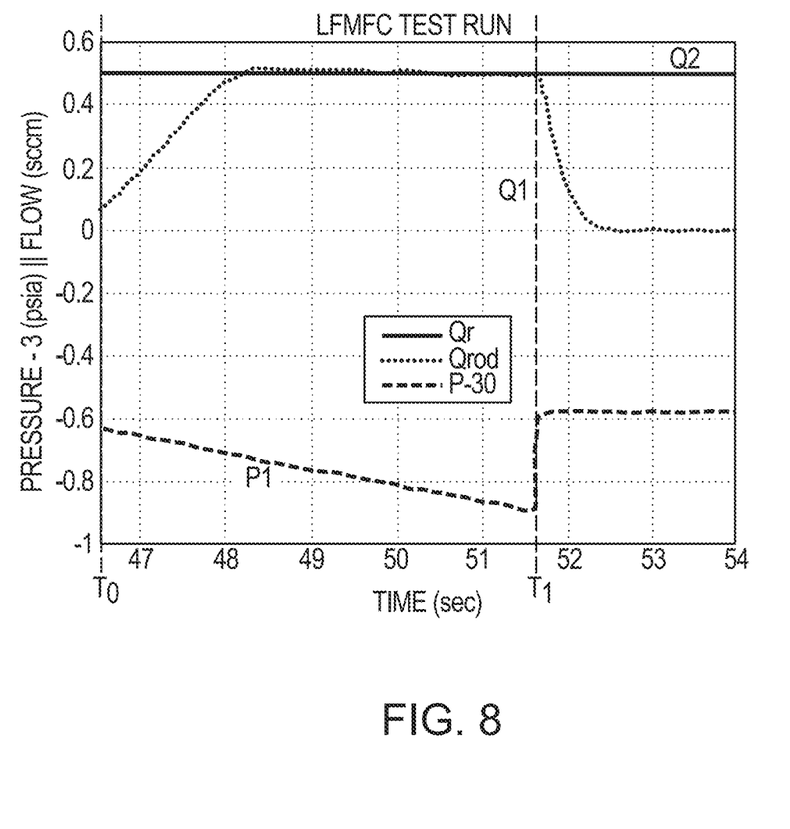
FIG. 8 is a graph of pressure and flow over time exhibited by an example mass flow controller.

FIG. 8 is a graph of pressure and flow over time exhibited by the MFC 100 in an example operation. With reference to FIG. 1, the upstream pressure $P_1$ and upstream rate of pressure decay flow $Q_1$ may be determined based on measurement of the pressure sensor 112 as described above. The controller 120 may use the upstream rate of pressure decay $Q_1$ to provide the self-verification function for the downstream critical flow measurement $Q_2$. When the upstream valve 102 is open, the pressure sensor 112 measures the pressure at the inlet 122. The controller 120 can report this pressure measurement back to the host as the measured inlet pressure.

At time $T_0$, the upstream valve 102 is closed during a rate of pressure decay flow measurement, the pressure inside the chamber is decreasing and $Q_1$ is obtained by Eq. (1). The valve 102 is again opened at time $T_1$. During this time between $T_0$ and $T_1$, the internal pressure in the chamber 110 drops as indicated by $P_1$. As a result, the pressure $P_1$ does not represent the true inlet pressure. The MFC 100 may be required to report the correct inlet pressure to the host during a measurement of the rate of upstream pressure decay flow even when the upstream valve is closed and the pressure sensor 112 may not be able to measure the inlet pressure. Yet, if the controller 120 were to report $P_1$ after $T_0$ as the inlet pressure to the host tool, it may trigger the tool pressure drop alarm. Although an additional pressure sensor can be implemented upstream of the valve 102 to directly measure the inlet pressure, such an addition can be costly and may be impractical to install at or near the MFC 100 due to the large size of typical pressure sensor.

Example embodiments can address this problem by selectively reporting the inlet pressure based on the status of the upstream valve, as described below with reference to FIGS. 9 and 10.

Figure 9:
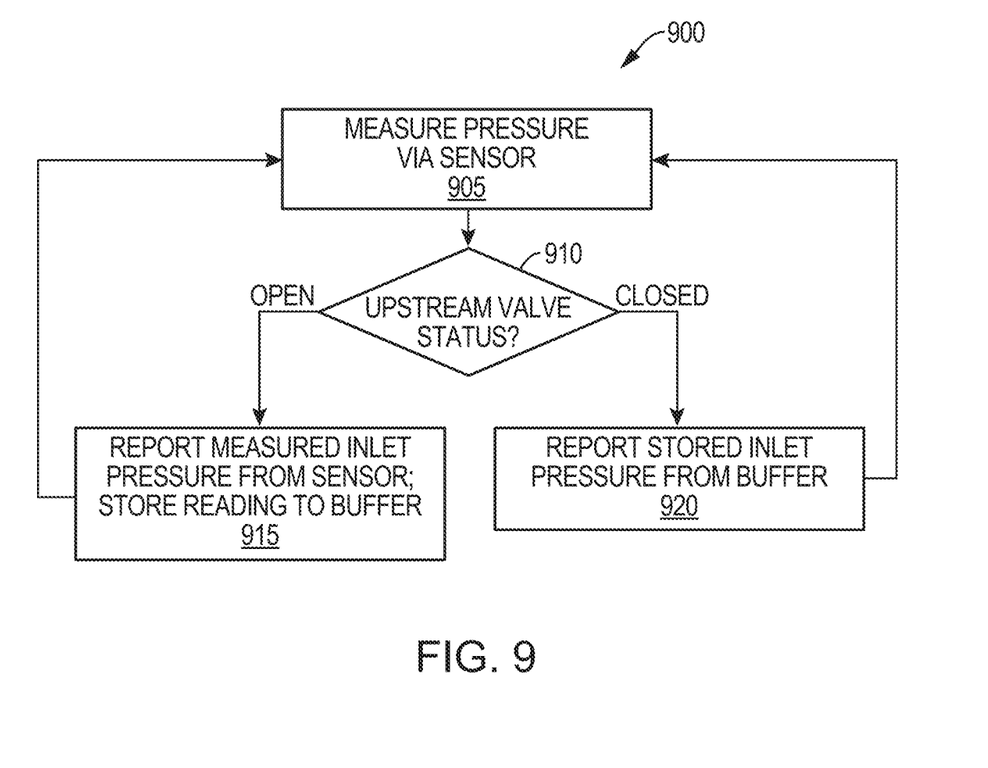
FIG. 9 is a flow diagram of a process of reporting measured inlet pressure in one embodiment.

FIG. 9 is a flow diagram of a process 900 of reporting measured inlet pressure. With reference to FIG. 1, the controller 120 may continuously or periodically measure the pressure $P_1$ from the pressure sensor 112 and monitor the status of the upstream valve 102 (905, 910). The controller 120 may toggle between two modes of reporting a measured inlet pressure based on the upstream valve status. In a first mode, when the upstream valve 102 is open, the controller 120 may report a measured inlet pressure based on a reading from the pressure sensor 112, and may store the reading to a buffer at the controller 120 or external to the controller 120 (915). In a second mode, when the upstream valve 102 is closed, the controller 120 may report the measured inlet pressure based on the reading stored to the buffer.

As a result, the inlet pressure reported by the controller 120 to the host will not indicate a pressure drop when the upstream valve 102 is closed during a rate of pressure decay flow measurement. Thus, the controller 120 can prevent a fault alarm at the host due to an inlet pressure drop.

Figure 10A:
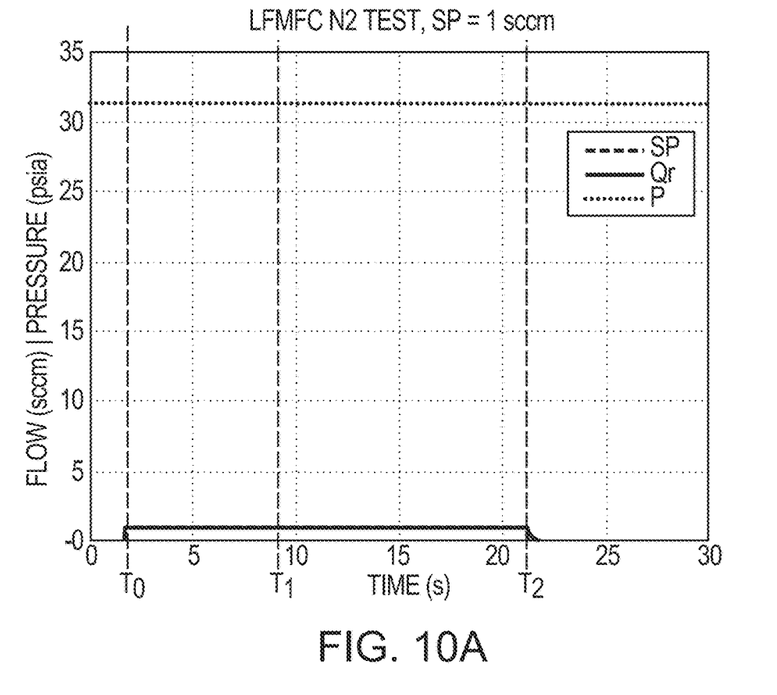
FIGS. 10A-B are graphs of pressure and flow over time exhibited by an example mass flow controller.
Figure 10B:
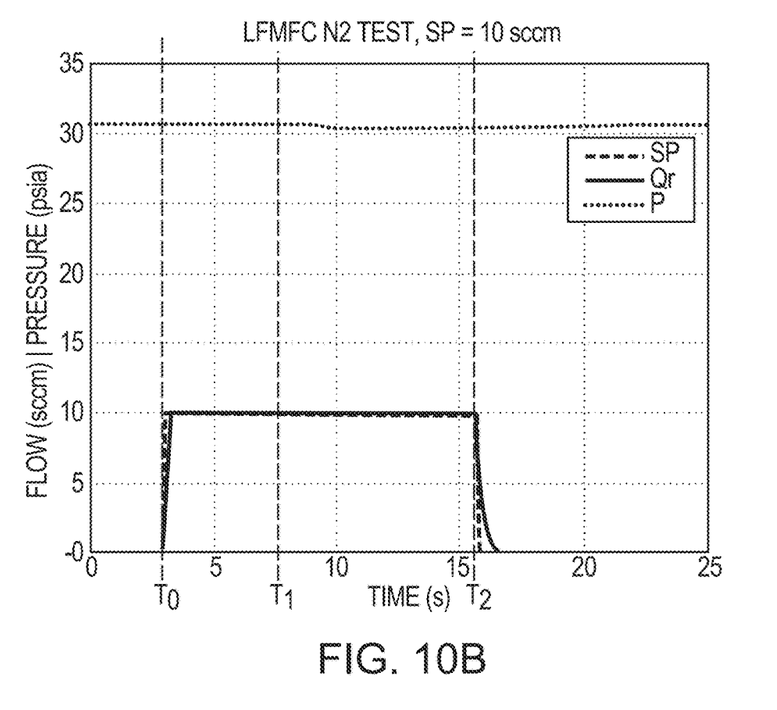

FIGS. 10A-B are graphs of reported pressure and flow over time as reported by the controller 120 operating the process 900 described above. The plots show a reported flow (Qr) and reported pressure (P) from the controller 120 to a host with a zero to non-zero setpoint (SP) change. In FIG. 10A, the SP change is 1 sscm, while in FIG. 10B, the SP change is 10 sccm. With reference to FIG. 1, prior to time $T_0$, the upstream valve is open, and the controller 120 report a measured inlet pressure based on a reading from the pressure sensor 112 and store the reading to a buffer. At time $T_0$, the upstream valve 102 is closed and the downstream valve 104 is open during a rate of decay flow measurement. During this time, the controller 120 may report the measured inlet pressure based on the reading previously stored to the buffer when the upstream valve 102 was open, thereby maintaining the value of P as shown in FIGS. 10A-B. The controller may be further configured to prevent or refrain from updating the reading stored to the buffer when the upstream valve is closed. At time $T_1$, the upstream valve 102 is opened and the MFC 100 enters pressure-based feedback control. Lastly, at time $T_2$, the SP drops to 0, and the downstream valve 104 is closed while the MFC 100 continues the pressure-based feedback control.

It can be seen that, upon closing the upstream valve 102 at time $T_0$, the upstream inlet pressure P does not change if the setpoint change is small. Further, the controller 120 may report a small pressure change due to a combination of a regulator and a small upstream plumbing volume if the setpoint change is larger. In the case of the larger setpoint of FIG. 10B, the actual measured pressure $P_1$ will drop below 26 PSIA during the rate of decay flow measurement. If the reported inlet pressure included such a drop, the host may trigger an alarm as described above. Thus, by implementing a buffered pressure signal and reporting the buffered signal during rate of decay flow measurement, such an alarm can be avoided. Further, the MFC 100 does not need to implement an additional pressure sensor to measure the inlet pressure, instead relying on the upstream pressure sensor 112 for measurements relating to the inlet pressure.

While example embodiments have been particularly shown and described, it will be understood by those skilled in the art that various changes in form and details may be made therein without departing from the scope of the embodiments encompassed by the appended claims.

What is claimed is:

1. A mass flow controller comprising:
   a chamber configured to receive a fluid;
   an upstream valve disposed upstream of the chamber;
   a downstream control valve disposed downstream of the chamber;
   a pressure sensor that detects fluid pressure in the chamber; and
   a controller configured to control the downstream control valve to control flow therethrough and to control actuation of the upstream valve, the controller configured to toggle between:
      when the upstream valve is open, reporting a measured inlet pressure based on a reading from the pressure sensor and storing the reading to a buffer; and
      when the upstream valve is closed, reporting the measured inlet pressure based on the reading stored to the buffer.

2. The mass flow controller of claim 1, wherein the controller is further configured to prevent updating the reading stored to the buffer when the upstream valve is closed.

3. The mass flow controller of claim 1, wherein the pressure sensor is a first pressure sensor, and further comprising:
   a pressure drop element disposed downstream of the downstream control valve; and
   a second pressure sensor that detects fluid pressure downstream of the downstream control valve and upstream of the pressure drop element;
   wherein the controller is further configured to toggle between:
      flow-based feedback control comprising monitoring of a flow rate based on a rate of decay of pressure in the chamber as detected by the first pressure sensor upon closure of the upstream control valve, and pressure-based feedback control comprising monitoring of a pressure upstream of the pressure drop element as detected by the second pressure sensor.

4. A method of controlling a flow rate comprising:

receiving a fluid to a chamber disposed between an upstream valve and a downstream control valve;

detecting fluid pressure in the chamber;

controlling actuation of the upstream valve via a controller;

controlling the downstream control valve to control flow therethrough via the controller; and toggling between:
- reporting a measured inlet pressure based on a reading from the pressure sensor and storing the reading to a buffer when the upstream valve is open; and
- reporting the measured inlet pressure based on the reading stored to the buffer when the upstream valve is closed.

\* \* \* \* \*